No. 752,054. Patented February 16, 1904.

UNITED STATES PATENT OFFICE.

EWALD ENGELS, OF DÜSSELDORF, GERMANY.

PROCESS OF TREATING IRON AND STEEL.

SPECIFICATION forming part of Letters Patent No. 752,054, dated February 16, 1904.

Application filed December 10, 1902. Serial No. 134,645. (No specimens.)

*To all whom it may concern:*

Be it known that I, EWALD ENGELS, engineer, a subject of the Emperor of Germany, residing at 72 Parkstrasse, Düsseldorf, in the Empire of Germany, have invented certain new and useful Improvements in Processes of Treating Iron and Steel by Means of Carbon or Carbon Combinations, of which the following is a specification.

Hitherto in treating iron and steel with carbids the latter were usually added to iron and steel alone, whereby it was proposed to decompose the carbids by means of heat or electricity. In these processes only such carbids could be employed as could be decomposed by heat or electricity, so that a number of highly-valuable carbids, such as carbid of silicon, (SiC,) were excluded, which either cannot be decomposed by heat and electricity or for their decomposition require such high degrees of heat that the iron or steel to be treated would be burned. These disadvantages are removed by the present invention, which consists in adding to iron and steel the carbids not alone, but with such additions as decompose the carbids.

This process has, furthermore, the advantage that the reaction between carbon and iron—*i. e.*, the carbonization of iron—will be accelerated and the physical qualities of iron and steel will be improved.

Example: Carbid of silicon (SiC) is mixed with sulfate of sodium ($Na_2SO_4$) and the mixture applied to iron and steel in a cold state and then the iron or steel annealed with the mixture, or the pieces of iron and steel after being heated are covered with the mixture.

I am aware that carbon in the presence of metallic oxids has been used for treating iron and steel. The present invention is distinguished from this known process by employing instead of carbon carbids in the presence of agents that decompose the carbids. Furthermore, it is known to add carbids to fluid iron to recarbonize bloom-iron. The present invention is distinguished from this known process by adding the carbid with its additions to the iron and steel in a cold or heated state and not to the fluid metal. Finally, it is known to treat iron and steel with acetylene gas and, furthermore, with carbids, which, as above mentioned, are decomposed by heat or electricity. In contradistinction to this process this invention consists in employing carbids with agents that decompose the carbids.

What I claim is—

1. The process that consists in treating iron or steel in a solid state with solid carbid and an agent that decomposes such carbid, and causing a reaction by means of heat, for substantially the purposes set forth.

2. The process that consists in treating iron or steel in a solid state with carbid of silicon and a decomposable alkali salt, and causing a reaction by means of heat, for substantially the purposes set forth.

3. The process for treating iron and steel, which consists in treating iron or steel in the solid state with carbid of silicon and sulfate of sodium, and causing a reaction by means of heat, for substantially the purposes set forth.

In testimony whereof I have signed this specification in the presence of two subscribing witnesses.

EWALD ENGELS.

Witnesses:
PETER LIEBER,
WILLIAM ESSENWEIN.